Figure 1:
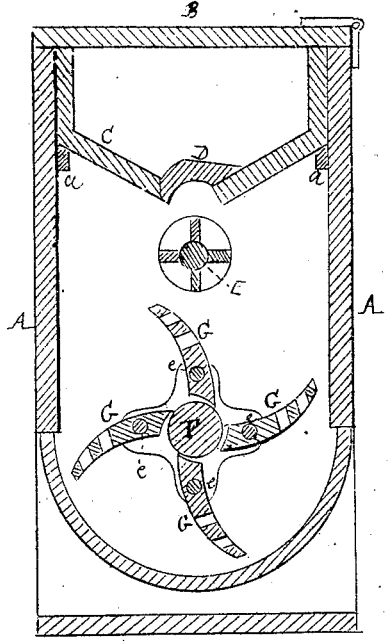
Figure 3:
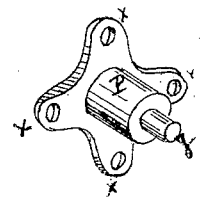
Figure 2:
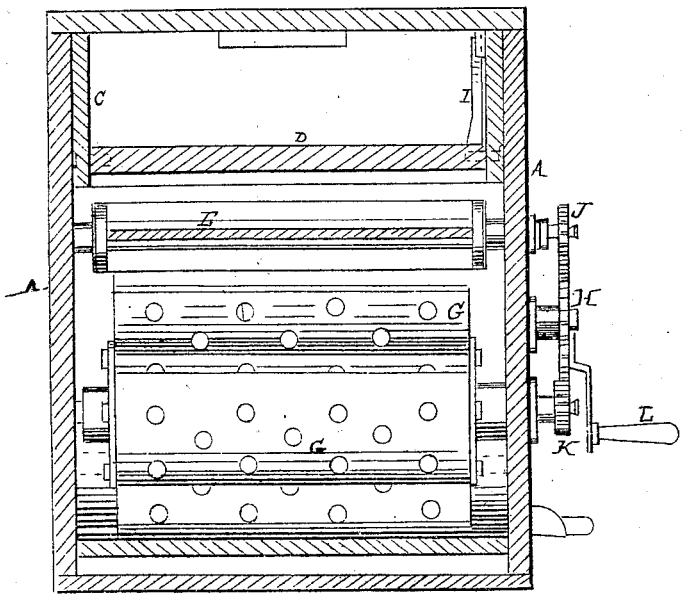

J. B. Rumsey's Churn.

No. 73932

PATENTED
JAN 28 1868

Witnesses
A. H. Marr

Inventor
J. B. Rumsey
per
Alexander H. Mason
Atty

United States Patent Office.

JESSE B. RUMSEY, OF PORT HURON, MICHIGAN.

Letters Patent No. 73,932, dated January 28, 1868.

IMPROVEMENT IN CHURNS.

The Schedule referred to in these Letters Patent and making part of the same.

TO ALL WHOM IT MAY CONCERN:

Be it known that I, JESSE B. RUMSEY, of Port Huron, in the county of St. Clair, and in the State of Michigan, have invented certain new and useful Improvements in Churns; and do hereby declare that the following is a full, clear, and exact description thereof, reference being had to the accompanying drawings, and to the letters of reference marked thereon.

In the annexed drawings, making part of this specification, A represents a square churn-box, made of any suitable size, and in any of the known and usual ways. The bottom of this box is made semicircular or concave, as seen. B represents the hinged cover of the box. Fitted within the mouth of the box A is a vessel or trough, C, which rests upon the cleats a a, and which is provided with a converging bottom, in which is a long slot. The slot in the bottom of this vessel or trough is provided with a cover, D, which turns upon a pivot at each end, and which is provided with a handle, by means of which it is moved and made to open or close the slot in the trough.

The object of this vessel is to hold the milk or cream until the machinery below it is set in motion; then, by opening the slot, by means of the cover D, the amount of milk can be regulated. It is desirable to allow the milk to pass through very slowly, so that it will be thoroughly acted upon by the wheels below.

Beneath the vessel C are two shafts, E and F, one below the other, which have their bearings in the ends of the box. The shaft E has upon it four wings or paddles, which extend almost its entire length, and which are permanently secured to it. Shaft F is provided with a series of wings, G G, which are pivoted at their ends to heads upon the shaft. These wings are nearly as long as the box, are curved as represented, and are provided with a series of holes, which are made diagonally through them. These wings turn upon their pivots, so that they fold up when the shaft is revolved in one direction. When the shaft is revolved in the other direction, the wings stand at right angles to it, their inner edges striking the shaft, and preventing their turning over. J and K are pinions upon the outer ends of two short shafts, which said shafts passing through the ends of the box A, enter openings in the ends of the shafts E and F. H represents a gear-wheel, which is secured upon a short shaft, placed centrally between the wheels J and K. This wheel H gears into the wheels or pinions J and K, and serves to give them motion, being provided with a handle, L, by means of which power is applied to it. The short shafts of the pinions J and K are held in position by means of bent-spring bars, which have points which rest against or in the centres of the outer faces of the pinions J and K. These shafts may be removed by removing the bars referred to, and then the shafts E and F can be taken from the box, so that the box and the shafts themselves, with their wings, can be washed and kept clean. A hole is made in the bottom of the box for the discharge of the milk after churning. P represents a metallic collar, which is used upon the ends of the shaft F. One of these collars has a journal, g, while the other one has the short shaft of pinion K, for its journal. These collars P have arms x x, in which are holes to receive the pivots in the ends of the wings G G.

Having thus fully described my invention, what I claim, is—

1. The vessel or hopper C, provided with a long slot in its bottom, and with a slide or cover, D, to close this slot for regulating and controlling the supply of milk to the churn below, substantially as set forth.

2. The shaft E, provided with wings, and situated beneath the vessel or hopper C, as and for the purpose specified.

3. The wings or paddles G G, made in a curved form, and arranged upon the shaft F, near the bottom of the churn, with holes made diagonally through them, and with journals on each end, so that they will fold up on the shaft, substantially as set forth.

4. The collars P, for the ends of the shaft F, said collars being provided with arms, in which are holes to receive the journals of the wings G G, as and for the purpose set forth.

In testimony that I claim the foregoing, I have hereunto set my hand, this 20th day of September, 1867.

JESSE B. RUMSEY.

Witnesses:
ASA LARNED,
J. H. LARNED.